US005482547A

United States Patent [19]

Bugnon et al.

[11] Patent Number: 5,482,547

[45] Date of Patent: Jan. 9, 1996

[54] SILANE-COATED ORGANIC PIGMENTS

[75] Inventors: Philippe Bugnon, Essert; Jean Allaz, Arconciel, both of Switzerland

[73] Assignee: Ciba-Geigy Corporation, Tarrytown, N.Y.

[21] Appl. No.: 191,572

[22] Filed: Feb. 3, 1994

[30] Foreign Application Priority Data

Feb. 9, 1993 [CH] Switzerland .............................. 383/93

[51] Int. Cl.$^6$ .................................................... C09B 57/12

[52] U.S. Cl. .......................... 106/493; 106/419; 106/434; 106/437; 106/450; 106/481; 106/499; 106/163.1; 106/204; 106/22 R; 106/23 R; 106/23 D; 106/22 D; 523/461

[58] Field of Search .................................... 106/434, 419, 106/493, 437, 450, 481, 499, 163.1, 204; 523/461

[56] References Cited

U.S. PATENT DOCUMENTS

| | | | |
|---|---|---|---|
| 3,025,173 | 3/1962 | Bernstein | 106/32 |
| 3,370,971 | 2/1968 | Linton | 106/434 |
| 3,470,007 | 9/1969 | Linton | 106/434 |
| 3,639,133 | 2/1972 | Linton | 106/434 |
| 4,107,133 | 8/1978 | Sawai et al. | 524/88 |
| 4,139,660 | 2/1979 | Tur | 427/353 |
| 4,880,472 | 11/1989 | Bugnon et al. | 106/493 |
| 5,271,769 | 12/1993 | Bugnon et al. | 106/419 |
| 5,274,010 | 12/1993 | Bugnon et al. | 523/206 |

FOREIGN PATENT DOCUMENTS

| | | |
|---|---|---|
| 057388 | 8/1982 | European Pat. Off. . |
| 103986 | 3/1984 | European Pat. Off. . |
| 140620 | 5/1985 | European Pat. Off. . |
| 140688 | 5/1985 | European Pat. Off. . |
| 0296111 | 12/1988 | European Pat. Off. . |
| 466646 | 1/1992 | European Pat. Off. . |
| 4300453 | 7/1994 | Germany . |
| 50-51527 | 5/1975 | Japan . |
| 51-74039 | 12/1976 | Japan . |
| 7207051 | 5/1972 | Netherlands . |
| 2274108 | 7/1994 | United Kingdom . |

OTHER PUBLICATIONS

Derw. Abst. 68491 E/33 of EP 057,388; Aug. 1982.

Dynamit Nobel Chemie, Dynasylan Jan. 1985 pp. 2–15.

Dyes and Pigments vol. 17 (No Month Available 1991) 323–340 Giesche et al.

Chem. Abst. 92(18):148707f of JP 79/160 433 Dec. 1979.

Chem. Abst. 116(12):107610q of EP 466,646 Jan. 1992.

*Primary Examiner*—Mark L. Bell
*Assistant Examiner*—Scott L. Hertzog
*Attorney, Agent, or Firm*—Michele A. Kovaleski

[57] ABSTRACT

Compositions comprising a) an organic material of high molecular weight in the form of a paint or varnish or of a printing ink, b) a pigment composition comprising an organic pigment whose particle surface is provided with a tenacious coating of alkyl silicate, said coating being fixed by adsorption of an alkyl silicate on a layer that coats the surface of the pigment particles and consists essentially of partially hydrolyzed organic compounds of elements of group 4A or 4B of the Periodic System selected from the group consisting of chelates of formula

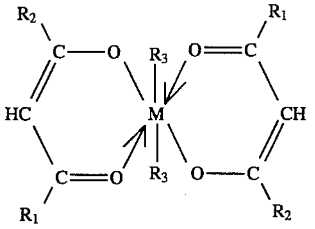

(I)

or

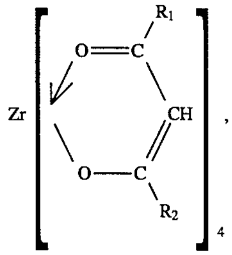

(II)

wherein $R_1$ is methyl, ethyl, methoxy or ethoxy, $R_2$ is methyl or ethyl and $R_3$ is halogen or $C_1$–$C_4$alkoxy, and M is Ti or Sn, and of esters of formula $$M_1(OR_4)_4 \quad \text{(III)},$$

wherein $M_1$ is an element of group 4A or 4B of the Periodic System and $R_4$ is $C_1$–$C_4$alkyl, which alkyl silicate is hydrolyzed before, during or after adsorption. The colorations obtained with these compositions are distinguished by surprisingly good gloss. The pigment compositions b) have excellent rheological properties.

16 Claims, No Drawings

SILANE-COATED ORGANIC PIGMENTS

The present invention relates to organic pigments the particles of which are provided with a tenacious coating of silanes fixed by means of an interlayer which contains hydroxyl groups. These pigments are distinguished by excellent properties, especially by very good rheological properties of the mill bases prepared therefrom.

It is commonly known to coat the surface of pigment particles to obtain enhanced properties, as disclosed, inter alia, in U.S. Pat. Nos. 3,370,971, 3,470,007 and 3,639,133. The teaching of these patents relates to coating inorganic pigments, preferably lead chromates, with silica, in some cases in conjunction with alumina. From JP-A-75/51 527 and JP-A-79/160 433 it is also known to coat organic pigments with silica; and Netherlands patent application 72/7051 discloses organic pigments coated with silica and water-soluble metal salts of typically $Sn^{4+}$, $Ti^{4+}$ or $Zr^{4+}$. The results obtained with these methods are, however, not entirely satisfactory, as these coatings are easily removed, especially in solvent systems such as paints and varnishes.

EP-A-57 388 and U.S. Pat. No. 4,139,660 teach that it is possible to increase the surface tension, and thereby the wettability, of solid substrates by treatment with organometallic compounds or salts of elements of the 4th main or auxiliary group of the Periodic System. In U.S. Pat. No. 4,139,660 attention is drawn expressly to the fact that no hydrolysis should occur in the course of the application. A colourant formulation for polyethylene, which consists of organic pigments containing an organosilane compound and/or an organititanium compound, is disclosed in U.S. Pat. No. 4,107,133. A process for coating pigment particles with titanium hydrate is disclosed in U.S. Pat. No. 3,025,173. However, even the pigment compositions obtained by these methods are not satisfactory in all respects, for example in paint systems, especially in high-solid systems containing hyperdispersants (q.v. J. S. Hampton, J. F. Mac Millan, American Ink Maker, January 1985, p. 16 et seq.), which find increasing use at the present time. However, in U.S. Pat. No. 4,880,472 it is taught that the very hydrolysis hitherto regarded as undesirable is required to solve this problem, and that organic pigments provided with a tenacious coating of silica or alumina can be obtained by fixing said coating by means of a hydroxyl group containing interlayer of partially hydrolysed chelates or alkyl esters of acids of the elements of groups 4A or 4B of the Periodic System to the surface of the pigment particle. The above-mentioned shortcomings of the pigment compositions of this kind disclosed in the prior art are thereby overcome.

Surprisingly, it has now been found that by carrying out the same procedure, but replacing the silica or alumina coating with a silane coating, better results can be obtained.

The alkyl esters of silicic acid normally termed silanes and suitable for use in the practice of this invention are commonly known products. They are fully described as bonding agents in, inter alia, Dynamit Nobel's technical information leaflet relating to its DYNASYLAN® products. In various publications they are also mentioned in connection with organic pigments, but always in another form and for utilities other than those of this invention.

In EP-A 103 986, EP-A 140 620 and EP-A 140 688 it is taught to introduce silane radicals into anthraquinone and perylene dye molecules by chemical bonding in order to convert the dyes into pigments that are particularly capable of being grafted on to inorganic substrates to form so-called "composite pigments". According to H. Giesche & E. Matijevic, Dyes and Pigments 17 (1991) 323–340, acid dyes can also be converted by treatment with a suspension of silica and aminosilanes into pigments of specific particle size. From JP-A-76/74 03 it is known to coat organic pigments with silane and water glass to enhance their suitability for pigmenting polyolefins.

EP-A 466 646 (U.S. Pat. No. 5,274,010) discloses organic pigments whose particle surface is coated with a silane layer that consists essentially of a hydrolysed γ-methacryloxyalkyl trialkoxysilane, which in turn is adsorbed on a layer of hydrolysed zirconium acetyl acetonate that is coated on the surface of the pigment particle and is, moreover, additionally coated with a layer of acrylic polymer. Such pigments are admirably suitable for the warp-free pigmenting of polyolefins.

Accordingly, the invention relates to compositions comprising a) an organic material of high molecular weight in the form of a paint system or of a printing ink composition, b) a pigment composition comprising an organic pigment whose particle surface is provided with a tenacious coating of alkyl silicate, said coating being fixed by adsorption of an alkyl silicate on a layer that coats the surface of the pigment particles surface and consists essentially of partially hydrolysed organic compounds of elements of group 4A or 4B of the Periodic System-selected from the group consisting of chelates of formula

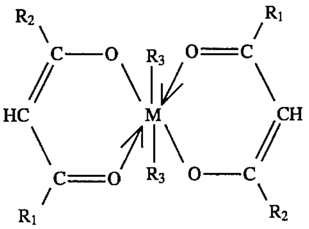

(I)

or

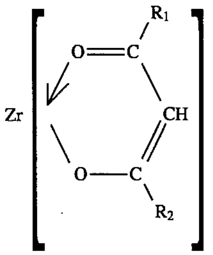

, (II)

wherein $R_1$ is methyl, ethyl, methoxy or ethoxy, $R_2$ is methyl or ethyl and $R_3$ is halogen or $C_1$–$C_4$alkoxy, and M is Ti or Sn, and of esters of formula $$M_1(OR_4)_4 \qquad (III),$$

wherein $M_1$ is an element of group 4A or 4B of the Periodic System and $R_4$ is $C_1$–$C_4$-alkyl, which alkyl silicate is hydrolysed before, during or after adsorption.

$R_1$ is preferably methyl or ethoxy and $R_2$ is preferably methyl.

$R_3$ defined as halogen is typically bromo, iodo and, preferably, chloro.

$R_3$ defined as $C_1$–$C_4$alkoxy is typically methoxy, ethoxy, n-propoxy, isopropoxy, n-butoxy, sec-butoxy or tert-butoxy.

In formula I, the preferred meaning of $R_3$, when M is Ti, is $C_1$–$C_4$alkoxy, more particularly isopropoxy.

[1]Grant & Haack's Chemical Dictionary, 5th edition, 1987

In formula I, the preferred meaning of $R_3$, when M is Sn, is halogen, more particularly chloro.

$R_4$ defined as $C_1$–$C_4$alkyl is methyl, ethyl, n-propyl, isopropyl, n-butyl, sec-butyl or tert-butyl, and is preferably ethyl, n-propyl, isopropyl or n-butyl.

$M_1$ is typically Sn, Si, Pb, Ge, Ti or Zr. Preferably $M_1$ is Si, Ti or Zr.

Compounds of formula II are preferred.

Particularly interesting compositions of this invention are those in which an alkyl silicate of formula

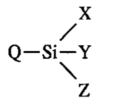

(IV)

is used, wherein

X is OR or Cl, Y and Z, each independently of the other, are OR, Cl or methyl and R is methyl or ethyl, and Q is a group

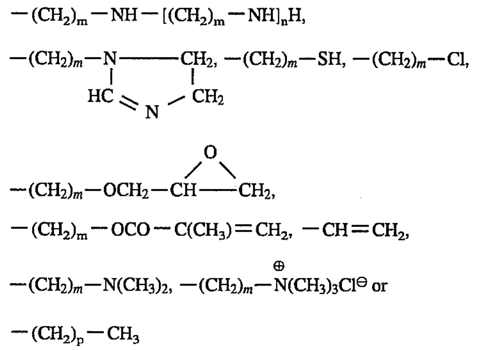

wherein m is 1 to 6, n is 0, 1 or 2, and p is 6 to 20, and especially those in which an alkyl silicate of formula

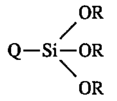

(V)

is used, wherein R is methyl or ethyl, and Q is a group

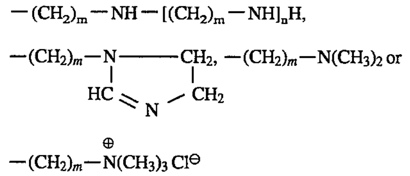

m is 1 to 3 and n is 0, 1 or 2.

Alkyl silicates of formula V as defined above, wherein m is 3, are especially preferred.

All customary organic pigments, including quinophthalones, indanthrones, flavanthrones, pyranthrones, anthraquinones, perylenes, dioxazines, perinones, thioindigo, metal complexes and, in particular, diketopyrrolopyrroles, azo pigments, quinacridones, phthalocyanines, isoindolines and isoindolinones, are suitable for the preparation of the compositions of this invention. Diketopyrrolopyrroles are preferred.

The preparation of pigment composition (b) is conveniently carried out as described hereinbelow.

The organic pigment is dispersed by conventional methods in water or a lower alkyl alcohol (e.g. methyl, ethyl, n-propyl, isopropyl, n-butyl, sec-butyl, tert-butyl or amyl alcohol). To this suspension is conveniently added 1 to 15% by weight, preferably 2–7% by weight, based on the pigment, of a compound of formula I, II or IH, in each case calculated as oxide, in powder form or as solution.

The mixture is usually stirred for at least one hour in the temperature range from 20° to 80° C. Depending on the reagent employed, the pH is in the range from 2 to 6. The pH is raised to 7–9 to initiate the partial hydrolysis. Suitable bases are inorganic as well as organic compounds, including aqueous sodium hydroxide, aqueous potassium hydroxide, ammonia, sodium alcoholate, potassium alcoholate, sodium silicate, sodium aluminate or pyridine. The hydrolysis can also be initiated by raising the temperature. Thereafter stirring is continued in the temperature range from 50° to 80° C., whereupon the pH gradually falls. As soon as the pH is stable (1–20 hours, depending on the temperature and reagents), the resultant suspension is cooled and reacted in this form with the alkyl silicate (A), or is filtered, and the filter cake is washed with water, dried, and then treated in solid form with the alkyl silicate (B).

If the procedure of method (A) is carried out, then the suspension is heated, with stirring, and reacted with 0.5 to 50% by weight, preferably 1 to 25% by weight and, most preferably, 2 to 12% by weight, of alkyl silicate, based on the pigment. Stirring is continued for 2 to 6 hours and the batch is filtered. The filter residue is washed with water and dried in a vacuum drying oven at 80°–120° C.

If the procedure of method (B) is carried out, then the above product is mixed in solid form with the requisite amount indicated above of alkyl silicate, conveniently in a rotary evaporator, and the mixture is stirred for 2 to 6 hours in the temperature range from 150° to 250° C. Afterwards the product is conveniently washed with a hydrophobic and then with a hydrophilic organic solvent and finally with water, and dried in a vacuum drying oven at 80°–120° C.

It is, however, also possible to add the alkyl silicate in the requisite amount indicated above separately before, during or after the addition of the pigment coated with the partially hydrolysed chelate or ester of formula I, II or III when blending the pigment with the organic material of high molecular weight.

Organic materials of high molecular weight which, in the form of a paint system or printing ink, may suitably be used as component (a) of the compositions of this invention are cellulose ethers and esters, typically including ethyl cellulose, nitrocellulose, cellulose acetate or cellulose butyrate, natural resins or synthetic resins, typically polymerisation or condensation resins such as aminoplasts, preferably urea/formaldehyde and melamine/formaldehyde resins, alkyd resins, phenolic plastics, polycarbonates, polyurethanes, polyesters, silicone and silicone resins, singly or in mixtures.

Organic materials of high molecular weight in dissolved form as film formers, typically boiled linseed oil, nitrocellulose, alkyd resins, phenolic resins, melamine resins, acrylic resins and urea/formaldehyde resins, are also suitable.

Depending on the end use requirement, it is expedient to use the pigment compositions (b) as toners or in the form of preparations. The pigment compositions (b) can be used in an amount of 0.01 to 30% by weight, preferably 0.1 to 10% by weight, based on the organic material of high molecular weight to be pigmented.

For pigmenting paint systems and printing ink compositions, the weight organic materials of high molecular weight and the pigment compositions (b), together with optional additives such as fillers, other pigments, siccatives or plasticisers, are finely dispersed or dissolved in a common organic solvent or solvent mixture. The procedure may be such that the individual components by themselves, or also several jointly, are dispersed or dissolved in the solvent and thereafter all the components are mixed.

The colorations obtained are distinguished by good all-round fastness properties such as superior transparency, and good fastness to overspraying, migration, heat, light and weather.

Most particularly, the pigment compositions (b) are distinguished by excellent rheological properties in paint and printing ink systems, and the finishes obtained also exhibit superior gloss and excellent DOI (=distinctness of image).

Owing to the good rheological properties of the pigment compositions (b), it is possible to prepare paints with high loadings of pigment.

The pigment compositions (b) are especially suitable for colouring aqueous and/or solvent-borne paint systems, especially automotive lacquers. The most preferred utility is for metal effect finishes.

Pigment compositions (b) which contain the alkyl silicates of formula IV, wherein Q is not a group $—(CH_2)_m—OCO—C(CH_3)=CH_2$, and the use thereof in thermoplastics and theromoset plastics selected from the group consisting of urea/formaldehyde and melamine/formaldehyde resins, alkyd resins, phenolic plastics, polycarbonates, polyolefins, polystyrene, polyvinyl chloride, polyamides, polyurethanes, polyesters, rubber, casein, silicone and silicone resins, singly or in mixtures, in which they are distinguished by the same good properties as outlined above, are novel and constitute a further object of the present invention.

Accordingly, the invention also relates to pigment compositions comprising an organic pigment coated with an alkyl silicate, wherein the surface of the pigment particles is provided with a tenacious coating of an alkyl silicate, said coating being fixed by adsorption of an alkyl silicate of formula

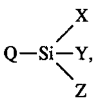

(IV)

wherein

X is OR or Cl, Y and Z are each independently of the other OR, Cl or methyl, and R is methyl or ethyl, and Q is a group $—(CH_2)_m—NH—[(CH_2)_m—NH]_nH,$

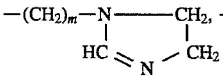

$—(CH_2)_m—SH, —(CH_2)_m—Cl,$

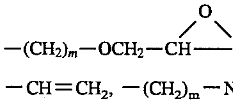

$—CH=CH_2, —(CH_2)_m—N(CH_3)_2,$ $—(CH_2)_m—\overset{\oplus}{N}(CH_3)_3\,Cl^{\ominus}$ or $—(CH_2)_p—CH_3$ wherein m is 1 to 6, n is 0, 1 or 2 and p is 6 to 20, on a layer that coats the surface of the pigment particles and consists essentially of partially hydrolysed organic compounds of elements of group 4A or 4B of the Periodic System, selected from the group consisting of chelates of formula

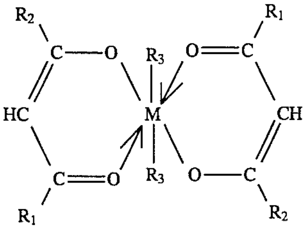

(I)

or

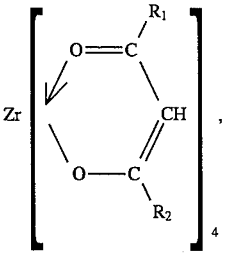

(II)

wherein $R_1$ is methyl, ethyl, methoxy or ethoxy, $R_2$ is methyl or ethyl and $R_3$ is halogen or $C_1$–$C_4$alkoxy, and M is Ti or Sn, and of esters of formula $M_1(OR_4)_4$ (III), wherein $M_1$ is an element of group 4A or 4B of the Periodic System and $R_4$ is $C_1$–$C_4$alkyl, which alkyl silicate is hydrolysed before, during or after adsorption.

The invention is illustrated by the following Examples in which, unless otherwise stated, percentages are by weight.

EXAMPLE 1 a) 326 g of a 36.8% moist filter cake of the diketopyrrolopyrrole pigment C.I. Pigment Red 255 are dispersed in 860 ml of water with 14.4 g of zirconium(IV) acetylacetonate (=3% $ZrO_2$, based on the pigment) for 18 hours. The suspension is heated to 75° C. and the pH is raised to 8.5 by addition of 2N NaOH. The suspension is stirred for 4 hours, the pH gadually falling to 5.8. The suspension is cooled and kept for the further reaction.

b) 100 g of the suspension obtained according to a) is heated to 90° C., then 0.5 g of triamino-modified propyltrimethoxysilane (DYNASYLAN® TRIAMO, sold by Dynamit Nobel; 5% silane, based on the pigment) is added and stirring is continued for 2 hours at this temperature. After cooling, the product is isolated by filtration, washed with water and dried in a vacuum drying oven at 120° C.

EXAMPLE 2

100 g of the suspension obtained according to Example 1 a) are filtered, the residue is washed with water and dried in a vacuum drying oven at 80° C. Afterwards a mixture of the product and 0.5 g of octadecyl dimethylmethoxysilane are charged to a rotary evaporator and the mixture is treated for 3 hours at 200° C. The resultant product is washed with 200 ml of xylene, isolated by filtration, and the residue is washed first with isopropanol and then with water, and dried in a vacuum drying oven at 80° C.

EXAMPLES 3–10

Example 1 is repeated with the sole exception that the triamino-modified propyltrimethoxysilane is replaced with the same amount of each of the silanes listed in column 2 of Table 1.

TABLE 1

| Example | Silane |
|---|---|
| 3 | γ-aminopropyltriethoxysilane[1] |
| 4 | N-aminoethylaminopropyltrimethoxysilane[2] |
| 5 | 4,5-dihydro-1-[3-(triethoxysilyl)propyl]imidazole[3] |
| 6 | γ-methacryloxypropyltrimethoxysilane[4] |
| 7 | octyltriethoxysilane[5] |
| 8 | dimethyloctadecylmethoxysilane |
| 9 | octadecyltrimethylsilane |
| 10 | 3-(triethoxysilyl)propyltrimethylammonium chloride (65% in water) |

[1]DYNASYLAN ® AMEO (Dynamit Nobel)
[2]DYNASYLAN ® DAMO (Dynamit Nobel)
[3]DYNASYLAN ® IMEO (Dynamit Nobel)
[4]DYNASYLAN ® MEMO (Dynamit Nobel)
[5]DYNASYLAN ® OCTEO (Dynamit Nobel)

EXAMPLES 11–15

Example 1 is repeated, replacing C.I. Pigment Red 225 with the same amount of the pigment indicated in column 2 of Table 2, and the silane with the same amount of the silane indicated in column 3, and using the amount of zirconium acetylacetonate, calculated as oxide, indicated in column 4.

TABLE 2

| Example | Pigment | Silane | $ZrO_2$ |
|---|---|---|---|
| 11 | C.I. Pigment Yellow 110[6] | DYNASYLAN ® TRIAMO | 4% |
| 12 | C.I. Piment Yellow 129[7] | DYNASYLAN ® DAMO | 4% |
| 13 | C.I. Pigment Red 177[8] | DYNASYLAN ® TRIAMO | 3% |
| 14 | C.I. Pigment Blue 15:3[9] | DYNASYLAN ® DAMO | 4% |
| 15 | C.I. Pigment Violet 19[10] | DYNASYLAN ® IMEO | 3% |

[6]isoindolinone pigment
[7]metal complex pigment
[8]anthraquinone pigment
[9]copper phthalocyanine pigment
[10]quinacridone pigment

EXAMPLES 16–19

Example 1 is repeated, replacing C.I. Pigment Red 255 with the same amount of the orange pigment 1,4-diketo-3,6-bis(4-tert-butylphenyl)pyrrolo[3,4-c]pyrrole and the silane with the respective silane indicated in column 2 of Table 3 in the amount given for the silane in Example 1.

TABLE 3

| Example | Silane |
|---|---|
| 16 | DYNASYLAN ® AMEO |
| 17 | DYNASYLAN ® DAMO |
| 18 | DYNASYLAN ® TRIAMO |
| 19 | dimethylaminopropyltrimethoxysilane |

EXAMPLE 20

20 g of C.I. Pigment Red 255 are dispersed in 200 g of isopropyl alcohol. To the dispersion are added 2.75 g of titanium(IV) diacetylacetonate-diisopropylate. After stirring for 1 hour, 10 ml of a 2% solution of sodium isopropylate in isopropyl alcohol are added. The suspension is afterwards heated to 75° C. and stirring is continued for 3 hours. The suspension is cooled and, after addition of 300 ml of water, heated to reflux temperature. Then 1 g of triamino-modified propyltrimethoxysilane (DYNASYLAN® TRIAMO) is added and stirring is continued for 2 hours under reflux. After cooling, the product is isolated by filtration, washed with water and dried in a vacuum drying oven at 120° C.

EXAMPLE 21

Example 20 is repeated, replacing titanium(IV) diacetylacetonate-diisopropylate with 2.5 g of titanium(IV) isobutylate.

EXAMPLE 22

2 g of the product obtained according to Example 1b) and 48 g of a stoving lacquer comprising 56 g of alkyd resin ALKYDAL® F310 (Bayer AG; 60% in xylene)

13 g of melamine resin CYMEL® 327 (Cyanamid; 90% in butanol)

25 g of xylene 25 g of butanol 2.5 g of 1-methoxy-2-propanol and 1 g of silicone oil (1% in xylene)

are mixed by conventional methods. The resultant colour lake is drawn to a film on a glass plate. Before stoving in a circulating air oven (30 minutes at 120° C.), the coating is allowed to dry in the air for c. 30 minutes at an inclination of 25°.

The gloss values are measured with a gloss meter (Zehntner ZGM 1020®) at an inclination of 20° according to DIN 67 530.

The finish so obtained has a gloss which is c. 20% better than that of a finish obtained with an uncoated pigment.

Replacement of the product of Example 1b) with each of the products of Examples 2 to 10 gives comparable results, with a c. 20–30% improvement in gloss over finishes obtained with uncoated pigment.

EXAMPLE 23

To determine the flow properties, the products of Examples 1–21 as well as the corresponding untreated pigments are incorporated in conventional manner into an alkyd paint system (SETAL® 84, Kunstharzfabrick Synthesis BV, Holland; solids content 70% by weight).

The flow properties of the mill base so obtained, which contains 12% by weight of pigment and 42% by weight of total solids and whose pigment/binder ratio is 0.3, are determined with a HAAKE ROTOVISCO® RV12 viscosimeter (measuring temperature: 25° C.; measuring system: SV-SP; shear range: D=0–100[1/s]).

Compared with the mill bases obtained with untreated pigments, the mill bases obtained with the products of Examples 1–21 have flow properties that are improved by about 50–70% (viscosity values).

EXAMPLE 24

Example 22 is repeated, except that 1.5 g of the product of Example 1a) is used instead of 2 g of the product of Example 1b) and 0.5 g of DYNASYLAN® TRIAMO is added direct to the lacquer composition. Comparable results are obtained.

EXAMPLE 25

The procedure of Example 1b) is repeated, except that DYNASYLAN® TRIAMO is replaced with the same amount of prehydrolysed dodecyl trichlorosilane.

What is claimed is:

1. A composition comprising a) an organic material of high molecular weight in the form of a paint system or of a printing ink composition; and b) a pigment composition consisting essentially of an organic pigment whose particle surface is provided with a tenacious coating of alkyl silicate, said coating being fixed by adsorption of an alkyl silicate of formula (IV)

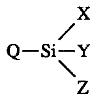

(IV)

wherein

X is OR or Cl,

Y and Z, each independently of the other, are OR, Cl or methyl,

R is methyl or ethyl, and

Q is a group $-(CH_2)_m-NH-[(CH_2)_m-NH]_nH$,

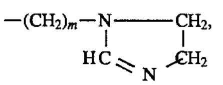

$-(CH_2)_m-SH$, $-(CH_2)_m-Cl$,

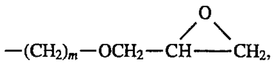

$-(CH_2)_m-OCO-C(CH_3)=CH_2$, $-CH=CH_2$, $-(CH_2)_m-N(CH_3)_2$, $-(CH_2)_m-\overset{\oplus}{N}(CH_3)_3Cl^{\ominus}$ or $-(CH_2)_p-CH_3$ wherein m is 1 to 6, n is 0, 1 or 2, and p is 6 to 20, on a layer that coats the particle surface and consists essentially of partially hydrolysed organic compounds of elements of group 4A or 4B of the Periodic System selected from the group consisting of chelates of formula

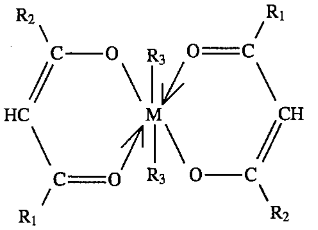

(I)

or

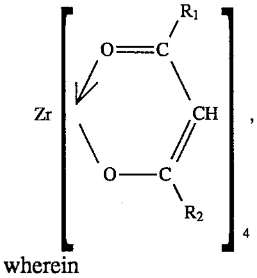

(II)

wherein $R_1$ is methyl, ethyl, methoxy or ethoxy, $R_2$ is methyl or ethyl and $R_3$ is halogen or $C_1$–$C_4$alkoxy, and M is Ti or Sn, and of esters of formula $M_1(OR_4)_4$ (III), wherein $M_1$ is an element of group 4A or 4B of the Periodic System and $R_4$ is $C_1$–$C_4$alkyl, which alkyl silicate is hydrolysed before, during or after adsorption.

2. A composition according to claim 1, which comprises the use of an alkyl silicate of formula

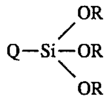

(V)

wherein R is methyl or ethyl, and Q is a group $-(CH_2)_m-NH-[(CH_2)_m-NH]_nH$,

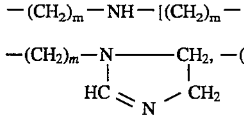

, $-(CH_2)_m-N(CH_3)_2$ or $-(CH_2)_m-\overset{\oplus}{N}(CH_3)_3Cl^{\ominus}$ m is 1 to 3 and n is 0, 1 or 2.

3. A composition according to claim 2, which comprises the use of an alkyl silicate of formula V, wherein m is 3.

4. A composition according to claim 1, which contains chelates of formulae I and II, wherein $R_1$ is methyl or ethoxy and $R_2$ is methyl.

5. A composition according to claim 1, which contains chelates of formula I, wherein M is Ti and $R_3$ is $C_1$–$C_4$alkoxy.

6. A composition according to claim 1, which contains chelates of formula I, wherein M is Sn and $R_3$ is chloro.

7. A composition according to claim 1, which contains esters of formula III, wherein $M_1$ is Si, Ti or Zr and $R_4$ is ethyl, n-propyl, isopropyl or n-butyl.

8. A composition according to claim 1, which contains the compound of formula I, II or III in an amount of 1 to 15% by weight, calculated in each case as oxide, based on the pigment.

9. A composition according to claim 1, which contains the alkyl silicate in an amount of 0.5 to 50% by weight, based on the pigment.

10. A composition according to claim 1, which comprises an organic pigment selected from the group consisting of diketopyrrolopyrroles, azo pigments, quinacridones, quinophthalones, phthalocyanines, indanthrones, flavanthrones, pyranthrones, anthraquinones, perylenes, dioxazines, perinones, thioindigo, isoindolines, isoindolinones and metal complexes.

11. A composition according to claim 10, which comprises an organic pigment selected from the group consisting of diketopyrrolopyrroles, azo pigments, quinacridones, phthalocyanines, isoindolines and isoindolinones.

12. A composition according to claim 10, which comprises a diketopyrrolopyrrole.

13. A composition according to claim 1, wherein the organic material of high molecular weight is a paint system.

14. A composition according to claim 13, wherein the paint system is an automotive lacquer.

15. A pigment composition consisting essentially of an organic pigment coated with an alkyl silicate, wherein the surface of the pigment particles is provided with a tenacious coating of an alkyl silicate, said coating being fixed by adsorption of an alkyl silicate of formula

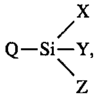

(IV)

wherein

X is OR or Cl, Y and Z are each independently of the other OR, Cl or methyl, and R is methyl or ethyl, and Q is a group $-(CH_2)_m-NH-[(CH_2)_m-NH]_nH$,

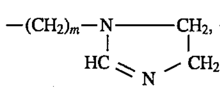 $-(CH_2)_m-SH$, $-(CH_2)_m-Cl$,

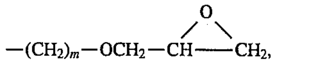

$-CH=CH_2$, $-(CH_2)_m-N(CH_3)_2$, $-(CH_2)_m-\overset{\oplus}{N}(CH_3)_3\,Cl^{\ominus}$ or $-(CH_2)_p-CH_3$ wherein m is 1 to 6, n is 0, 1 or 2 and p is 6 to 20, on a layer that coats the surface of the pigment particles and consists essentially of partially hydrolysed organic compounds of elements of group 4A or 4B of the Periodic System selected from the group consisting of chelates of formula

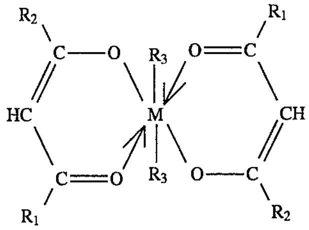

(I)

or

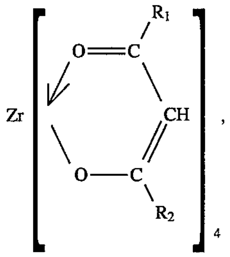

(II)

wherein $R_1$ is methyl, ethyl, methoxy or ethoxy, $R_2$ is methyl or ethyl and $R_3$ is halogen or $C_1$–$C_4$alkoxy, and M is Ti or Sn, and of esters of formula $$M_1(OR_4)_4 \qquad (III),$$

wherein $M_1$ is an element of group 4A or 4B of the Periodic System and $R_4$ is $C_1$–$C_4$alkyl, which alkyl silicate is hydrolysed before, during or after adsorption.

16. A plastic material selected from the group consisting of urea/formaldehyde and melamine/formaldehyde resins, alkyd resins, phenolic plastics, polycarbonates, polyolefins, polystyrene, polyvinyl chloride, polyamides, polyurethanes, polyesters, rubber, casein, silicone and silicone resins, singly or in mixtures, which material is pigmented with a composition as claimed in claim 15.

* * * * *